United States Patent
Gebhart et al.

(10) Patent No.: US 8,156,211 B2
(45) Date of Patent: Apr. 10, 2012

(54) TRANSITIONING FROM DYNAMIC CLUSTER MANAGEMENT TO VIRTUALIZED CLUSTER MANAGEMENT

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 249 days.

(21) Appl. No.: 12/037,864

(22) Filed: Feb. 26, 2008

(65) Prior Publication Data

US 2009/0216828 A1    Aug. 27, 2009

(51) Int. Cl.
*G06F 15/173* (2006.01)
*G06F 15/16* (2006.01)
*G06F 11/00* (2006.01)
*G06F 9/46* (2006.01)

(52) U.S. Cl. ............. 709/223; 709/201; 714/1; 718/105
(58) Field of Classification Search .................. 709/201, 709/223; 714/1; 718/105
See application file for complete search history.

(56) References Cited

U.S. PATENT DOCUMENTS

| | | | |
|---|---|---|---|
| 6,243,825 B1 * | 6/2001 | Gamache et al. | 714/4.4 |
| 7,516,214 B2 * | 4/2009 | Gandhi | 709/224 |
| 7,546,354 B1 * | 6/2009 | Fan et al. | 709/219 |
| 7,577,764 B2 | 8/2009 | Arndt et al. | |
| 7,577,959 B2 * | 8/2009 | Nguyen et al. | 718/105 |
| 2003/0051021 A1 * | 3/2003 | Hirschfeld et al. | 709/223 |
| 2005/0108593 A1 * | 5/2005 | Purushothaman et al. | 714/4 |
| 2006/0195715 A1 * | 8/2006 | Herington | 714/4 |
| 2008/0189700 A1 * | 8/2008 | Schmidt et al. | 718/1 |
| 2009/0037680 A1 | 2/2009 | Colbert et al. | |
| 2009/0276771 A1 * | 11/2009 | Nickolov et al. | 717/177 |

FOREIGN PATENT DOCUMENTS

GB    2419702    * 10/2004

* cited by examiner

*Primary Examiner* — Emmanuel L Moise
*Assistant Examiner* — Vitali Korobov
(74) *Attorney, Agent, or Firm* — Mintz, Levin, Cohn, Ferris, Glovsky & Popeo, P.C.

(57) ABSTRACT

Methods and apparatus, including computer program products, are provided for transitioning one or more aspect of a dynamic cluster of computers to one or more virtual machines. In one aspect, there is provided a computer-implemented method. The method may include receiving information representative of a dynamic cluster system and receiving information representative of a virtual machine. A controller may initiate, based on the received information representative of the dynamic cluster system and the virtual machine, a transition of one or more aspects of the dynamic cluster system to the virtual machine. Related apparatus, systems, methods, and articles are also described.

20 Claims, 5 Drawing Sheets

TRANSITIONING FROM DYNAMIC CLUSTER MANAGEMENT TO VIRTUALIZED CLUSTER MANAGEMENT

FIELD

The present disclosure generally relates to distributed computing systems. More particularly, the present disclosure relates to transitioning one or more aspect of a dynamic cluster of computers to virtualization technology, such as virtual machines.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications, including games.

Some attribute the popularity of computers to the Internet. The Internet provides people with a ready access to vast amounts of data. Many people now get their news, sports, stock, entertainment, and other information primarily from the Internet. But businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed dynamically.

A dynamic cluster is a cluster system that is managed by a controller (or manager) that dynamically optimizes the performance of the cluster. Moreover, a dynamic cluster (specifically, its controller) may start and stop individual instances of application servers as required. A dynamic cluster may also dynamically balance the workloads of the nodes of the cluster based on performance information collected from cluster nodes. As a consequence, dynamic clusters optimize the use of the processing capabilities of the computers in the clusters. When compared to a single computer hosting a single application server, the dynamic cluster may provide increased performance and overall lower total cost of ownership by better utilizing the existing processing capabilities of the cluster.

One example of a dynamic cluster system is provided by SAP, AG's NetWeaver Adaptive Computing infrastructure. The Adaptive Computing infrastructure enables the dynamic assignment of hardware resources to serve specific application services. In this way, SAP NetWeaver enables an Adaptive Computing infrastructure to provide business solutions based on SAP NetWeaver running at peak efficiency. In most cases, SAP's Adaptive Computing provides lower total cost of ownership by optimizing processing (e.g., better server utilization).

Virtualization technology provides another mechanism for optimizing processing. Virtualization technology provides a software layer that when executed allows multiple virtual machines with, in some cases, different operating systems to run side-by-side with other virtual machines running on the same physical machine (e.g., a node, computer, processor, server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five.

Virtualization software may also provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system and one or more applications. An operating system (OS) is the program that, after being initially loaded into a computer by a boot program, manages other programs on the computer. The other programs (also referred to as application programs or programs) may use the operating system by making requests for services through one or more application program interfaces (APIs) of the operating system. An application may perform one or more specific functions (or tasks) directly for a user or, in some cases, another program or application program. Examples of applications include spreadsheets, word processing, browsers, databases, and the like. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a virtual appliance. The phrase "virtual appliance" refers to an example of a virtual machine that may include the application, operating system, and other items (e.g., data, drivers, and etc.) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for transitioning one or more aspects of a dynamic cluster of computers to virtualization technology, such as virtual machines.

In one aspect, there is provided a computer-implemented method. The method may include receiving information representative of a dynamic cluster system and receiving information representative of a virtual machine. A controller may initiate, based on the received information representative of the dynamic cluster system and a virtual machine, a transition of one or more aspects of the dynamic cluster system to a virtual machine.

Variations may include one or more of the following features. The controller may initiate the transition of one or more aspects of the dynamic cluster system from the virtual machine to a physical machine. The controller may initiate a shut down of an application server of the dynamic cluster system by copying the application server to the virtual machine and then starting the application server at the virtual machine. The controller may create one or more virtual machines based on one or more of the following: a processing speed of a physical machine previously hosting the application server being shut down; a memory capacity of the physical machine previously hosting the application server being shut down; a storage capacity of the physical machine previously hosting the application server being shut down; and bandwidth from the network to the physical machine previously hosting the application server being shut down. The controller may also create a virtual machine based on one or more templates, each of the templates specifying one or more of the following: a processing speed, a memory capacity, a storage capacity, and a network bandwidth.

The subject matter described herein may be implemented to realize the advantage of facilitating a transition of aspects of a dynamic cluster from a physical machine implementation to one using virtual machines.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
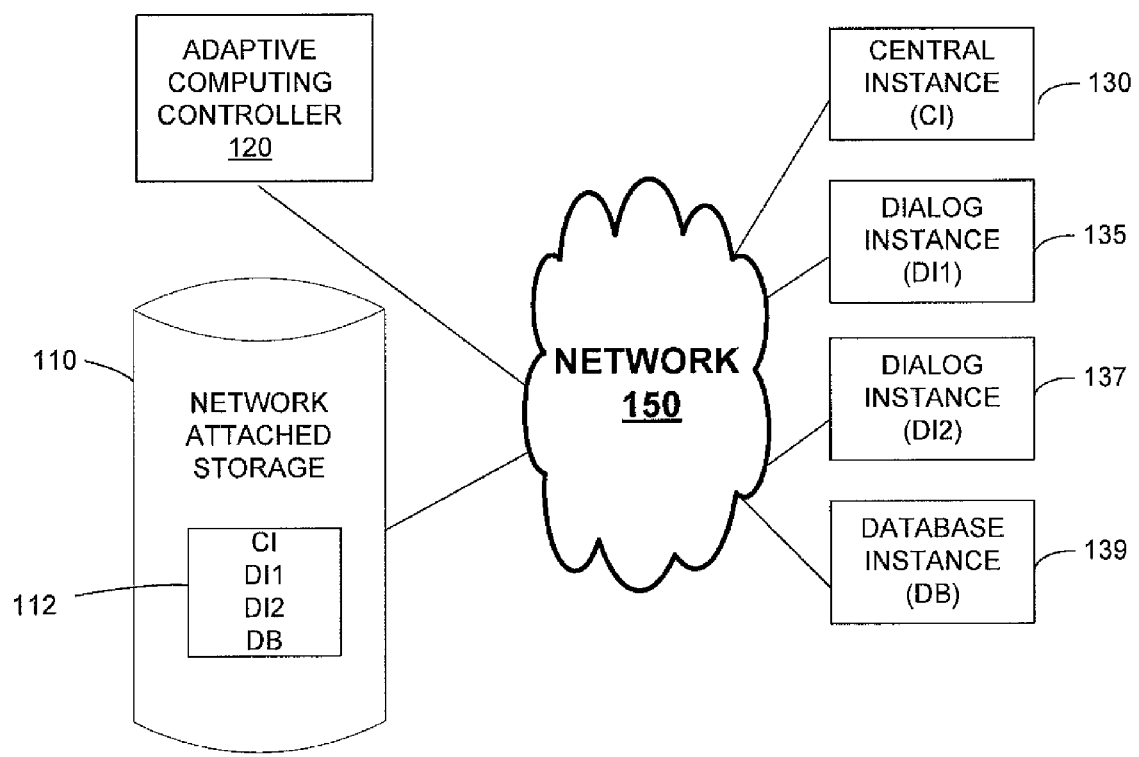
FIG. 1 depicts a block diagram of a dynamic cluster system.

Like labels are used to refer to same or similar items in the drawings.

DETAILED DESCRIPTION

FIG. 1 depicts a dynamic cluster system 100. The dynamic cluster management system 100 includes a network attached storage 110, a controller 120 (e.g., a central instance or SAP's Adaptive Computing Controller), cluster nodes (i.e., portions of a cluster) 130-139, all of which are coupled by a communication mechanism, such as network 150 (e.g., the Internet, an intranet, and/or intra-process communications). One or more of the central instances 130, dialog instances 135 and 137, and database instance 139 may be implemented on a host, i.e., a physical machine, such as a server, computer, processor, blade, and the like.

The controller 120 enables the addition and removal of computing resources with minimal administrative effort by, for example, persistently storing the application on a central storage, such as network attached storage 110. For example, at startup, an application is loaded from the persistent storage into the main memory of an attached physical host. In this way, there is little, or no, footprint on the local storage devices of the physical hosts. As such, an application can be stopped on one physical (or virtual) host and then re-started on another physical (or virtual) host. The controller 120 may also manage workloads and assign instances of applications to a computing resource. The controller 120 may also build connections between computing and storage resources, provide a transport layer for virtualization, and support different network topologies, such as TCP/IP, iSCSI, and Fibre Channel. The controller 120 may be coupled to, or include, a registry, such as SAP's system landscape directory (SLD), with information representative of the current and past state of the clusters.

Network attached storage 110 provides a storage mechanism and, in particular, a shared file system (or file server). For example, network attached storage 110 may store copies of application servers 112, such as a central instances (CI), dialog instances (DI1 and DI2), and database instances (DBI).

The central instance 130 is an application server that controls the processes within a cluster and may include a message server for communications.

The dialog instances 135 and 137 are also application servers configured on the cluster system 100. The dialog instance may be an application server providing applications, such as a customer relationship management (CRM) application, an enterprise resource planning (ERP) application, a product lifecycle management application, a supply chain management (SCM) application, a supplier relationship management application, as well as any other application. For example, when a client computer accesses an SCM application at the central instance, it is dispatched to any of the dialog instances and from then on, an instance of the SCM application runs on the physical machine on which the dialog instance runs. If another client computer accesses the central instance, the SCM application may be served from a different dialog instance or from the same dialog instance. In this example, the dialog instance 135 operates as an application server that wraps each instance of the SCM application, so that the two SCM applications can run independently regardless of whether they run on the same or different nodes within the cluster. Moreover, these aforementioned dialog instances represent complex applications, requiring complex and burdensome installation of the application, operating system, and associated data.

System 100 also includes an instance of a database instance 139 (i.e., a database application server).

Figure 2:
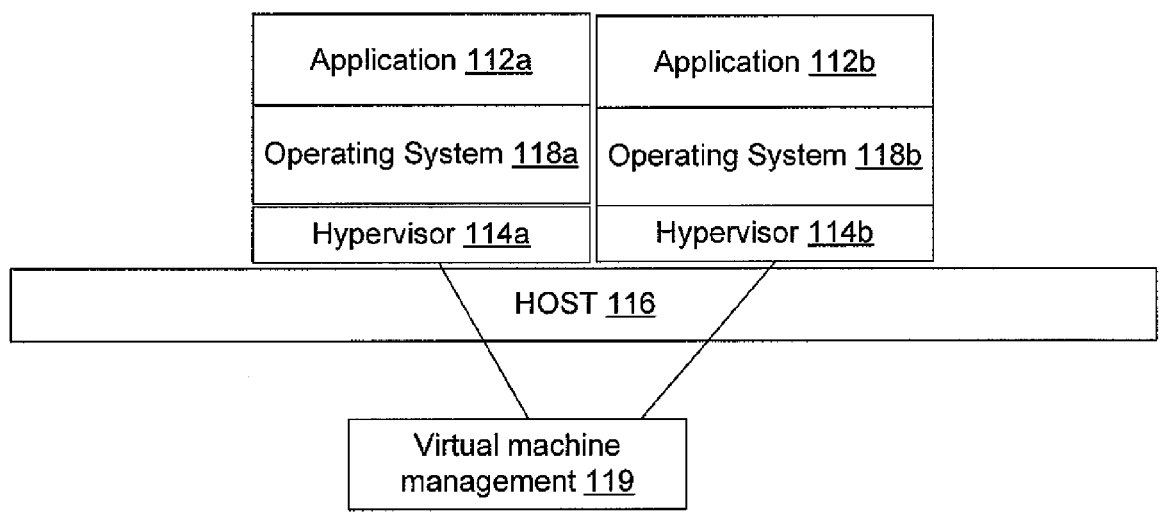
FIG. 2 depicts a block diagram of virtual machines.

FIG. 2 depicts an example implementation of virtualization technology. Referring to FIG. 2, a host 116 may be implemented as a physical machine capable of hosting one or more virtual machines. In some implementations, the virtual machines are implemented as hypervisors 114*a-b*. The hypervisor may control the physical machine's processor, memory, and other resources enabling the virtual operating environment. VMWare ESX and VMware Server are examples of hypervisor software for virtualizing an operating environment, including IP (Internet Protocol) addresses, registries, and other aspects normally used at a computer. In some implementations, the hypervisors 114a-b may be implemented as a virtual appliance, which refers to a virtual machine that includes an application, an operating system and, in some cases, data to configure and/or operate the application. Moreover, the virtual machines 114a-b may each run an application 112a-b. For example, the application 112a-b may be implemented as a central instance, a dialog instance, a database instance, or any other application or application server. In some implementations, each of the applications 112a-b may have an operating system 118a-b, such as Microsoft Windows, Microsoft Vista, Java, Sun OS, Linux, or any other operating system. Although FIG. 2 depicts a single host 116, two operating systems, and two virtual machines, any number (including zero) of hosts, operating systems, and/or applications may be implemented as well.

A virtual machine management system (e.g., VMWare Virtual Center) 119 (also referred to as a virtual machine controller or, more simply, a controller) may be used to control one or more hypervisors.

Although dynamic cluster systems offer numerous benefits, they are typically implemented on traditional hosts, i.e., physical machines. However, many users are now implementing virtualization technologies, such as virtual machines and hypervisors. To transition from a traditional, dynamic cluster system 100 (i.e., a cluster of computer nodes managed dynamically) to one including virtualization technology, numerous new installations are necessary since all the application servers (e.g., central instances, dialog instances, etc.) and their associated operating systems and data have to be individually re-installed on each of the virtual machines. In a system including hundred, thousands, if not millions of application servers, a re-installation onto each individual virtual machine is very time consuming and, as a consequence, very expensive. Moreover, even when automated tools are used, such as virtual machine management 119, the re-install process is a very time-consuming process and thus expensive process.

Moreover, even after virtualization technology is implemented on a dynamic cluster system, operating system updates may be necessary from time to time. To reduce downtime when such updates are required, it may be necessary to move one or more application servers from virtual machines to physical machines or, alternatively, other virtual machines. Furthermore, in existing dynamic cluster systems implementing virtualization technology, there may be instances when a portion of a cluster hosted on a virtual machine may be moved to a physical machine, when virtualization is no longer desired. For example, when few (if any) changes occur at a cluster, or a portion of a cluster, the benefit of implementing virtualization technology may not be cost effective when compared to using only a physical machine. When this is the case, the application server may be moved from a virtual machine to a physical machine implementation—saving virtual machine software license fees.

In view of the foregoing, the subject matter described herein may provide a process for transitioning one or more aspects of a dynamic cluster system from one or more physical machines to one or more virtual machines and/or transitioning one or more aspects of one or more virtual machines to physical machines of a dynamic cluster system. Moreover, in some cases, the process may include transitioning from one set of virtual machines to another set of virtual machines (e.g., switching to a new operating system version). In some implementations, these processes are computer-implemented to provide automation.

Figure 3A:
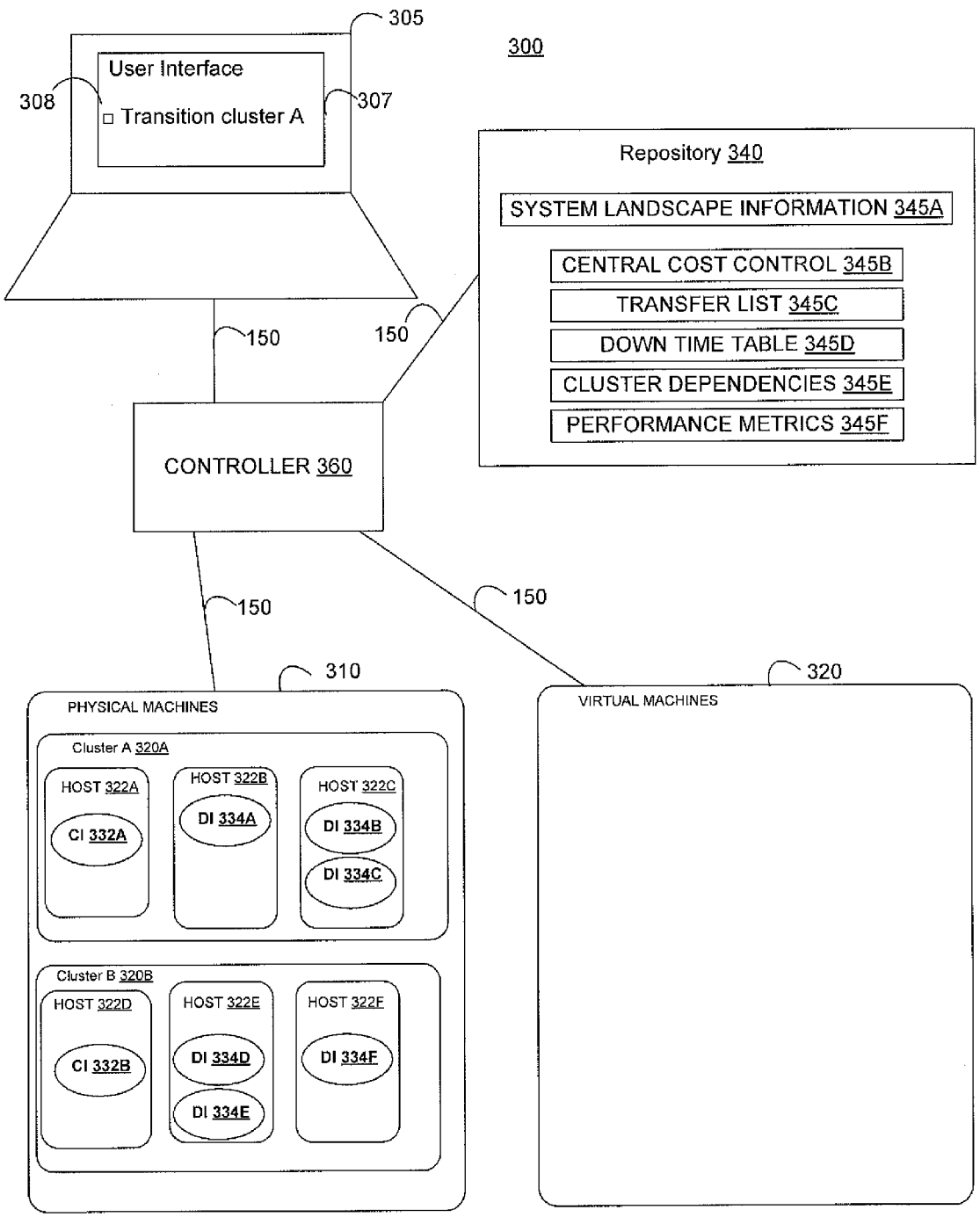
FIG. 3A depicts a system 300 for transitioning from a dynamic cluster implemented on physical machines to a dynamic cluster implemented using virtual machines.

FIG. 3A depicts a controller 360 for transitioning one or more aspect of a dynamic cluster system 310 implemented on physical machines to a dynamic cluster system 320 implementing virtual machines.

Referring to FIG. 3A, the system 300 includes a controller 360 coupled to a repository 340, a dynamic cluster system 310 implemented on physical machines, and a dynamic cluster system 320 implementing one or more virtual machines.

The controller 360 may control the transition of one or more aspects of dynamic cluster system 310 to dynamic cluster system 320 and vice versa. In some implementations, the controller 360 may be coupled to a computer 305 and a user interface 307. The user interface 307 enables a user to select one or more aspects of systems 310 or 320 for transitioning. Although the controller 360 is depicted as being outside of the dynamic clusters 320A and B, controller 360 may be located anywhere including within clusters 320A-B.

The repository 340 includes information describing system 300. In some implementations, repository 340 includes one or more of the following: system landscape information 345A representative of information describing physical machines or virtual machines (i.e., information describing whether application servers, such as central instances 332A-B and dialog instances 334A-F are implemented on a virtual machine or a physical machine); central cost control information (CCC) 345B including information necessary to save costs automatically (e.g., a central controller may determine a break-even point representing at which point it is better (e.g., in terms of cost, performance, and the like) to use a virtual machine rather than physical machines and vice versa); a transfer list (TL) 345C including hostnames of physical machines in system 310, hostnames of virtual machines in system 320, and a time when a transition may take place; downtime table (DT) 345D including timeframes of planned downtimes for system 300 (or portions of system 300); cluster dependencies (CD) data 345E including information describing which aspects of system 310 belong to each cluster (e.g., a cluster may include a central instance (CI) 332A, dialog instances (DIs) 334A-C, etc.); performance metrics (PM) data 345F, which can be provided to controller 360 to determine whether a transition from 310 to 320 should take place.

Dynamic cluster system 310 includes cluster A 320a and cluster B 320B. Cluster A 320A further includes a central instance 332A implemented on a host 322A and dialog instances 334A-C implemented on hosts 322B-C. Cluster B 320B further includes a central instance 332B implemented on a host 322D and dialog instances 334D-F implemented on hosts 322E-F. Hosts 322A-F represent physical machines, i.e., a server, computer, processor, blade, and the like. Nodes of a cluster are represented by each of central instances 332A-B dialog instances 334A-F.

FIG. 3A depicts that aspects of dynamic cluster system 310 have not been transitioned. In some implementations, a user at user interface 307 provides an indication to controller 360 to enable controller 360 to initiate a transition of one or more aspects (e.g., a portion of a cluster, a cluster, a set of clusters, and etc.) of dynamic cluster system 310 to implementations using virtual machines 320. For example, a user may select (e.g., using icon button 308) cluster A for a transition from physical machines to virtual machines.

Figure 3B:
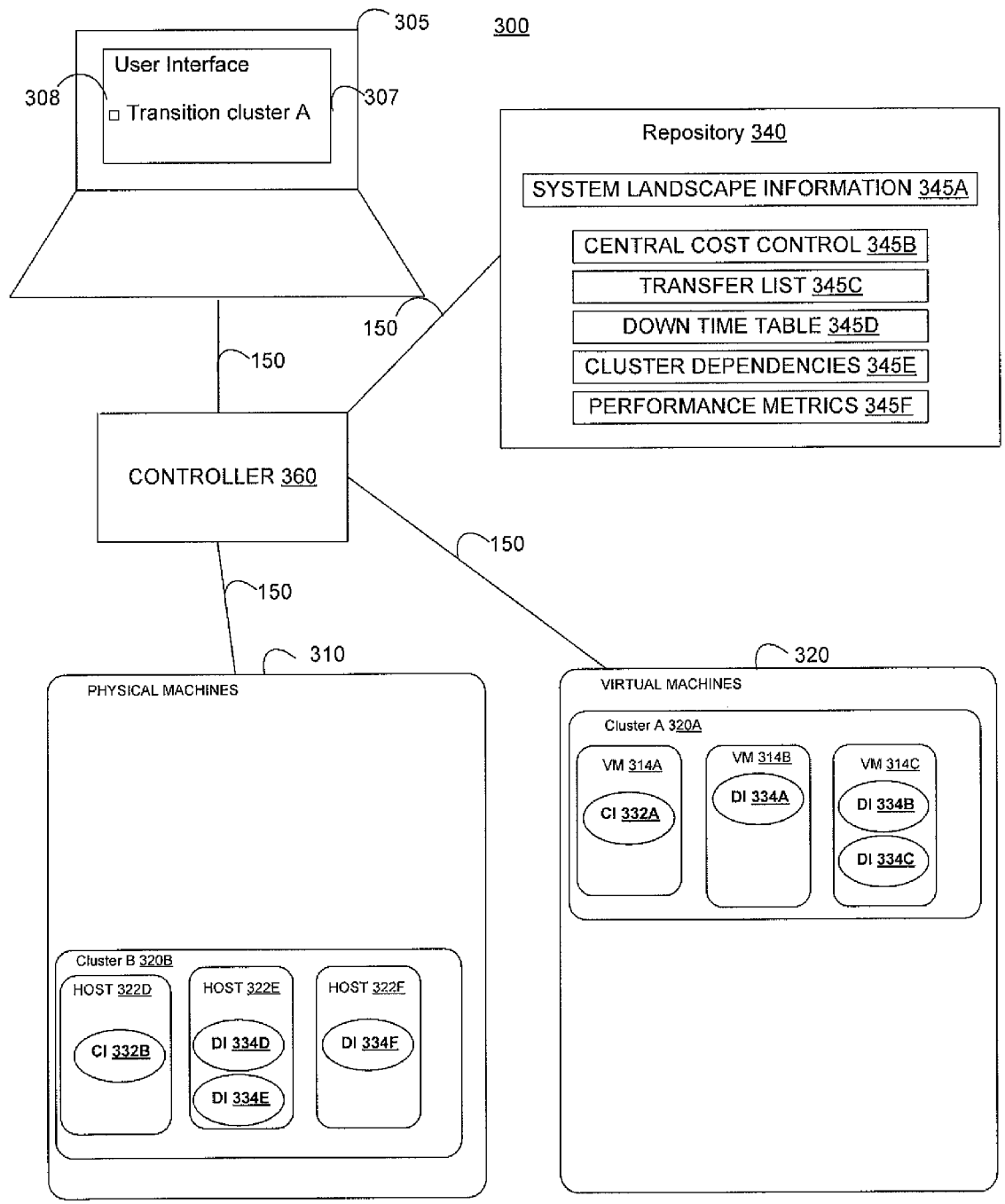
FIG. 3B depicts the system 300 after one or more aspects of the dynamic cluster have been transitioned to virtual machines.

FIG. 3B depicts system 300 after controller 360 has transitioned one or more aspects of dynamic cluster system 310 to implementations using virtual machines 320. Specifically, controller 360 has transitioned central instances 332A and dialog instances 334A-C to one or more virtual machines 314A-C. Although not shown, virtual machines 314A-C may be hosted on one or more physical machines. To transition central instances 332A and dialog instances 334A-C, controller 360 may shutdown, at physical machines 322A-C, central instances 332A and dialog instances 334A-C, install, at virtual machines 314A-B, central instances 332A and dialog instances 334A-C, and then restart, at virtual machines 314A-B, central instance 332A and dialog instances 334A-C. Although FIG. 3B depicts an entire cluster A 320A being transitioned, the transition may be of a single application server (e.g., central instance 332A), a set of clusters, as well as an entire landscape of clusters.

Figure 4:
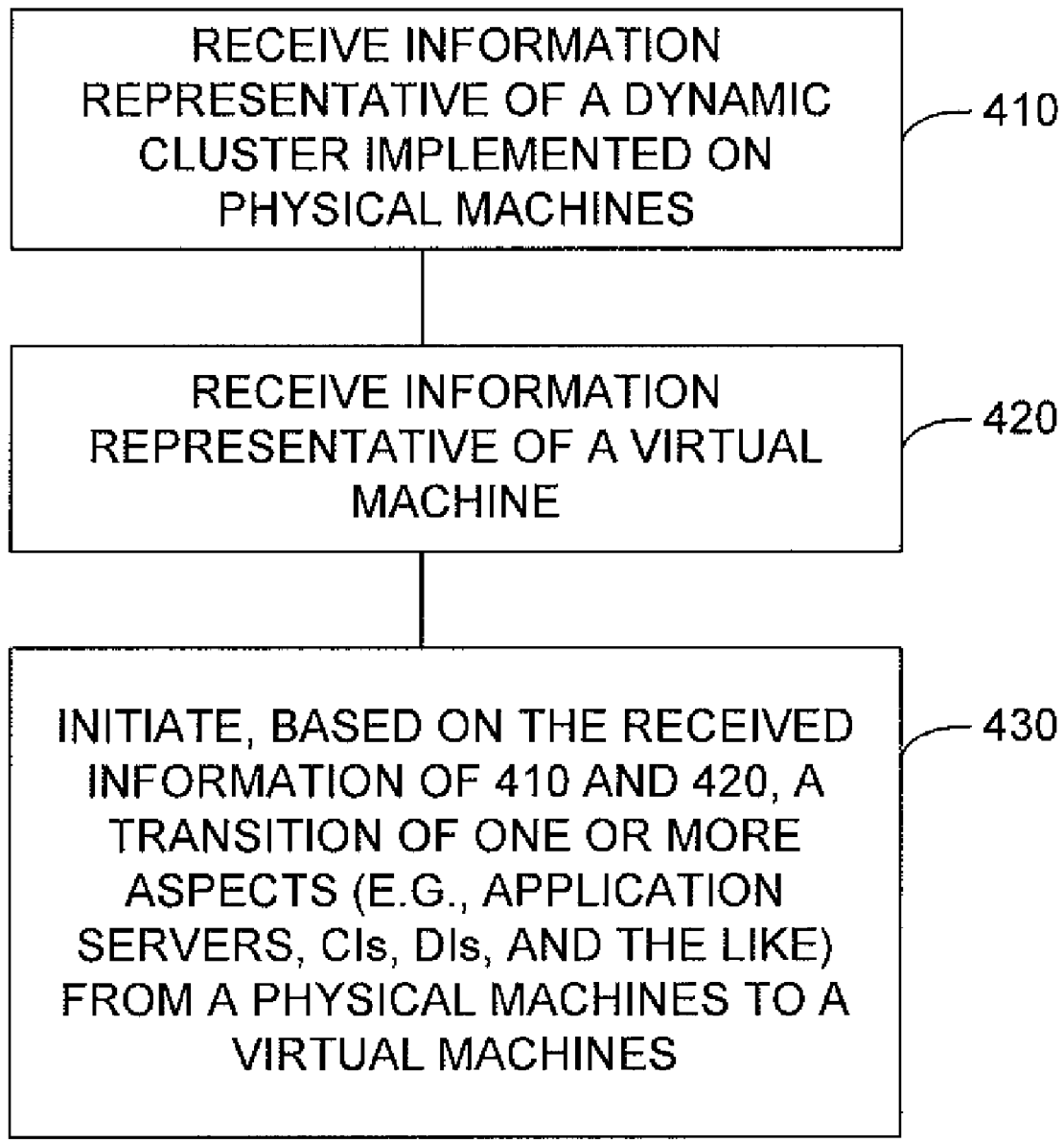
FIG. 4 depicts a process for transitioning from a dynamic cluster implemented on physical machines to a dynamic cluster system implemented using one or more virtual machines.

FIG. 4 depicts a process for transitioning from a dynamic cluster system implemented on physical machines to a dynamic cluster system implemented on one or more virtual machines. At 410, controller 360 receives information, such as one or more of the information described above with respect to repository 345. The received information enables controller 360 to determine whether an application server (e.g., a portion of a cluster, such as central instances, dialog instances, and the like) is implemented on a traditional, physical machine.

At 420, controller 360 may receive information to enable the controller to determine whether an application server is implemented using virtualization technology, such as virtual machines.

The received information at 410 and 420 may take various forms. In some implementations, controller 360 receives information from repository 345. The received information at 410 and 420 may include system landscape information 345A which includes information to enable controller 360 to determine whether an application server (e.g., portions of a cluster, such as central instances, dialog instances, and the like) is implemented on a traditional, physical machine or whether the application server is implemented using virtualization technology, such as virtual machines. For example, system landscape information may include an IP address and an indication of whether the address is associated with a virtual machine or a physical machine. One example of such a system landscape is the System Landscape Directory (SLD) available from SAP, AG, Walldorf, Germany.

Moreover, in one implementation, controller 360 may access a virtual machine management system or a hypervisor, to get information regarding whether any virtualization technology is being implemented. This information may include the addresses (e.g., Internet Protocol (IP) and/or Media Access Control (MAC) addresses) of virtual machines. Moreover, controller 360 may access one or more operating systems (or their interfaces) to access information indicative of whether a virtual machine or a physical machine is being used by the application on the operating system. In some cases, the operating system may expressly have information indicative of whether a virtual machine is being implemented. While in other cases, the operating system may provide data (e.g., time to execute a benchmark program) to enable the controller 360 to determine whether a virtual machine is being implemented at the operating system.

At 430, controller 360 may initiate, based on the received information of 410 and 420, a transition of one or more aspects (e.g., an application server, such as central instances, dialog instances, and the like) of the dynamic cluster from one or more physical machines to one or more virtual machines. For example, controller 360 may shutdown central instance 332A (FIG. 3A), install central instance 332A on a virtual machine 314A (FIG. 3B), and then restart central instance 332A. Similarly, controller 360 may shutdown dialog instances 334A-C (FIG. 3A), install dialog instances 334A-C on virtual machine 314B-C, and then restart those dialog instances. The virtual machines 314A-C may be hosted on one or more physical machine under the control of a hypervisor, as described above.

In some implementations, controller 360 may also transition one or more aspects back to a physical machine implementation. For example, controller 360 may transition dialog instance 334A (FIG. 3B) to a physical machine, such as host 322B. Controller 360 may determine, based on cost information (e.g., central cost control information (CCC) 345B) and activity (e.g., moves, shutdowns, and the like), that it may be more beneficial from a cost perspective to implement dialog instance 334A on a physical machine rather than a virtual machine. Indeed, in cases where there are few (if any) moves, shutdowns, and the like, of the application servers (e.g., dialog servers 334A-F and central instances 332 A-B), it may be more cost effective to use a physical machine. When this is the case, controller 360 may transition those application servers to physical machines. Nonetheless, to transition from virtual machines to physical machines, controller 360 shuts down the application server (e.g., dialog instance 334A at FIG. 3B) and the virtual machine 314B, installs that application server on a physical machine 322B (FIG. 3A), and restarts the dialog instance. Moreover, in some implementations, controller 360 may also transition one or more aspects from one set of virtual machines to another set of virtual machines.

In some implementations, controller 360 may receive information indicative of the characteristics of the physical machine hosting the application server and then create a virtual machine based on the received information. For example, controller 360 may receive information representative of host 322A (e.g., processor speed, memory capacity, storage capacity, network bandwidth, and the like). In this example, controller 360 creates virtual machine 314A based on the received information. Specifically, controller 360 may create virtual machine to have at least the processor speed, the memory capacity, the storage capacity, and the network bandwidth of physical machine 322A. In some cases, controller 360 may create virtual machine to have at least 25-35% more processor speed, memory capacity, storage capacity, network bandwidth, when compared to a physical machine, such as physical machine 322A.

In some cases, controller 360 may create virtual machines using a template including processor speed, memory capacity, storage capacity, network bandwidth, and the like.

In some implementations, controller 360 (or aspects of controller 360) may be implemented as part of a hypervisor 119, a dynamic cluster controller 120, or a combination of the two.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual machines, the virtual machines may be implemented as virtual appliances as well.

The foregoing description is intended to illustrate but not to limit the scope of the invention, which is defined by the scope of the appended claims. Other embodiments are within the scope of the following claims.

What is claimed is:

1. A computer-implemented method comprising:
receiving information representative of a dynamic cluster system, implemented without virtual machines, controlling one or more instances of application servers hosted on physical machines of the dynamic cluster system;
receiving information representative of a virtual machine hosting one or more other application servers instances;
initiating at a controller, based on the received information representative of the dynamic cluster system and the virtual machine, a transition of one or more physical machine aspects running on the physical machines of the dynamic cluster system implemented without virtual machines to the virtual machine that is to run the transitioned one or more physical machine aspect, the information including system landscape information representative of implementations of application servers in the dynamic cluster system and the virtual machine, and cost information representative of cost-benefit of implementing one or more of the application servers on the dynamic cluster system or on the virtual machine; and
initiating, at the controller, a transition of one or more virtual machine aspects from the virtual machine to the physical machines of the dynamic cluster system implemented without virtual machines that are to host the transitioned one or more virtual machine aspects based on the received information representative of the dynamic cluster system and the virtual machine, including the system landscape information and the cost information.

2. The computer-implemented method of claim 1, wherein initiating at the controller further comprises:
transitioning, by the controller, the one or more aspects from the virtual machine to the dynamic cluster system or from a set of virtual machines to another set of virtual machines.

3. The computer-implemented method of claim 1, wherein initiating further comprises:
shutting down an application server of the dynamic cluster system and starting the application server at the virtual machine.

4. The computer-implemented method of claim 3, wherein initiating further comprises:
creating one or more virtual machines, at least one of the virtual machines created based on one or more of the following: a processing speed of a physical machine previously hosting the application server being shut down; a memory capacity of the physical machine previously hosting the application server being shut down; a storage capacity of the physical machine previously hosting the application server being shut down; and bandwidth from the network to the physical machine previously hosting the application server being shut down.

5. The computer-implemented method of claim 1, wherein initiating further comprises:
creating one or more virtual machines based on one or more templates, each of the templates specifying one or more of the following: a processing speed, a memory capacity, a storage capacity, and a network bandwidth.

6. The computer-implemented method of claim 1, wherein receiving information representative of the dynamic cluster system further comprises:
receiving Internet Protocol addresses and Media Access Control addresses for one or more physical machines.

7. The computer-implemented method of claim 1, wherein receiving information representative of the virtual machine further comprises:
receiving Internet Protocol addresses for one or more virtual machines.

8. The computer-implemented method of claim 1 further comprising:
implementing the virtual machine as a virtual appliance.

9. The computer-implemented method of claim 1 further comprising:
implementing the controller as at least one of a hypervisor, a dynamic cluster controller, or a virtual machine management system.

10. The computer-implemented method of claim 1 further comprising:
initiating, at the controller, the transition of one or more aspects of the dynamic cluster system from the virtual machine to a physical machine.

11. The computer-implemented method of claim 10, wherein initiating further comprises:
shutting down an application server and the virtual machine and starting the application server at the physical machine.

12. A non-transitory machine readable storage device containing instructions to configure a processor to perform a method, the method comprising:
receiving information representative of a dynamic cluster system, implemented without virtual machines, controlling one or more instances of application servers hosted on physical machines of the dynamic cluster system;
receiving information representative of a virtual machine hosting one or more other application servers instances;
initiating at a controller, based on the received information representative of the dynamic cluster system and the virtual machine, a transition of one or more physical machine aspects of the dynamic cluster system implemented without virtual machines to the virtual machine that is to run the transitioned one or more physical machine aspect, the information including system landscape information representative of implementations of application servers in the dynamic cluster system and the virtual machine, and cost information representative of cost-benefit of implementing one or more of the application servers on the dynamic cluster system or on the virtual machine; and initiating, at the controller, a transition of one or more virtual machine aspects from the virtual machine to the physical machines of the dynamic cluster system implemented without virtual machines that are to host the transitioned one or more virtual machine aspects based on the received information representative of the dynamic cluster system and the virtual machine, including the system landscape information and the cost information.

13. The non-transitory machine readable storage device of claim 12, wherein initiating at the controller further comprises:

transitioning, by the controller, the one or more aspects from the virtual machine to the dynamic cluster system or from a set of virtual machines to another set of virtual machines.

14. The non-transitory machine readable storage device of claim 12, wherein initiating further comprises:

shutting down an application server of the dynamic cluster system and starting the application server at the virtual machine.

15. The non-transitory machine readable storage device of claim 14, wherein initiating further comprises:

creating one or more virtual machines, at least one of the virtual machines created based on one or more of the following: a processing speed of a physical machine previously hosting the application server being shut down; a memory capacity of the physical machine previously hosting the application server being shut down; a storage capacity of the physical machine previously hosting the application server being shut down; and bandwidth from the network to the physical machine previously hosting the application server being shut down.

16. The non-transitory machine readable storage device of claim 12, wherein initiating further comprises:

creating one or more virtual machines based on one or more templates, each of the templates specifying one or more of the following: a processing speed, a memory capacity, a storage capacity, and a network bandwidth.

17. The non-transitory machine readable storage device of claim 12, wherein receiving information representative of the dynamic cluster system further comprises:

receiving Internet Protocol addresses and Media Access Control addresses for one or more physical machines.

18. The non-transitory machine readable storage device of claim 12 further comprising:

receiving Internet Protocol addresses for one or more virtual machines;

implementing the virtual machine as a virtual appliance;

implementing the controller as at least one of a hypervisor or a dynamic cluster controller;

initiating, at the controller, the transition of one or more aspects of the dynamic cluster system from the virtual machine to a physical machine; and shutting down an application server and the virtual machine and starting the application server at the physical machine.

19. A system comprising:

a processor; and a memory, wherein the processor and the memory are configured to perform a method comprising:

receiving information representative of a dynamic cluster system, implemented without virtual machines, controlling one or more instances of application servers hosted on physical machines of the dynamic cluster system implemented without virtual machines;

receiving information representative of a virtual machine hosting one or more other application servers instances;

initiating at a controller, based on the received information representative of the dynamic cluster system and the virtual machine, a transition of one or more physical machine aspects of the dynamic cluster system implemented without virtual machines to the virtual machine that is to run the transitioned one or more physical machine aspect, the information including system landscape information representative of implementations of application servers in the dynamic cluster system and the virtual machine, and cost information representative of cost-benefit of implementing one or more of the application servers on the dynamic cluster system or on the virtual machine; and initiating, at the controller, a transition of one or more virtual machine aspects from the virtual machine to the physical machines of the dynamic cluster system implemented without virtual machines that are to host the transitioned one or more virtual machine aspects based on the received information representative of the dynamic cluster system and the virtual machine, including the system landscape information and the cost information.

20. The system of claim 19, wherein initiating further comprises:

transitioning, by the controller, the one or more aspects from the virtual machine to the dynamic cluster system or from a set of virtual machines to another set of virtual machines.

* * * * *